(12) United States Patent
Badic et al.

(10) Patent No.: US 11,374,672 B2
(45) Date of Patent: Jun. 28, 2022

(54) SAS CONTROLLED INTERFERENCE MANAGEMENT

(71) Applicant: Apple Inc., Cupertino, CA (US)

(72) Inventors: Bilijana Badic, Munich (DE); Markus Dominik Mueck, Neubiberg (DE); Srikathyayani Kathyayani Srikanteswara, Portland, OR (US); Sabine Roessel, Munich (DE); Thomas Wirth, Berlin (DE); Bernd Holfeld, Berlin (DE); Thomas Haustein, Berlin (DE)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/308,172

(22) PCT Filed: Jul. 8, 2016

(86) PCT No.: PCT/US2016/041643
§ 371 (c)(1),
(2) Date: Dec. 7, 2018

(87) PCT Pub. No.: WO2018/009227
PCT Pub. Date: Jan. 11, 2018

(65) Prior Publication Data
US 2019/0222339 A1 Jul. 18, 2019

(51) Int. Cl.
*H04J 11/00* (2006.01)
*H04W 16/24* (2009.01)
(Continued)

(52) U.S. Cl.
CPC ........ *H04J 11/0056* (2013.01); *H04B 17/336* (2015.01); *H04W 16/02* (2013.01);
(Continued)

(58) Field of Classification Search
CPC .. H04J 11/0056; H04B 17/336; H04W 16/02; H04W 16/24; H04W 24/10;
(Continued)

(56) References Cited

U.S. PATENT DOCUMENTS

| | | | | |
|---|---|---|---|---|
| 6,023,622 A | * | 2/2000 | Plaschke | H04W 16/10 455/452.2 |
| 2004/0137896 A1 | * | 7/2004 | Sarkar | H04J 13/0048 455/423 |
| 2005/0026608 A1 | * | 2/2005 | Kallio | H04B 7/18506 455/431 |

(Continued)

FOREIGN PATENT DOCUMENTS

KR 10-2013-0063985 A 6/2013

OTHER PUBLICATIONS

International Search Report and Written Opinion dated Mar. 17, 2017, on application No. PCT/US2016/041643.

*Primary Examiner* — Michael Thier
*Assistant Examiner* — Nevena Zecevic Sandhu
(74) *Attorney, Agent, or Firm* — Kowert, Hood, Munyon, Rankin & Goetzel, P.C.

(57) ABSTRACT

Various embodiments to enable Spectrum Access System (SAS) controlled interference management are disclosed herein. In one embodiment, an apparatus is provided. The apparatus includes a memory to store network configuration data and a processing device coupled to the memory. The processing device to generate a protection band based on interference measurements. The protection band is allocated to at least one of the infrastructure node of a Long-Term Evolution (LTE) network infrastructure. In this regard, the interference measurements are related to transmissions of data between infrastructure nodes of the LTE network infrastructure. Thereupon, a time slot is determined for the at least one of the infrastructure node based on the protection (Continued)

band. The time slot indicates an allocated time frame to access data in the LTE network infrastructure using a radio frequency in accordance with the protection band.

20 Claims, 9 Drawing Sheets

(51) Int. Cl.
*H04W 52/14* (2009.01)
*H04W 16/02* (2009.01)
*H04W 52/40* (2009.01)
*H04B 17/336* (2015.01)
*H04W 24/10* (2009.01)
*H04W 72/04* (2009.01)

(52) U.S. Cl.
CPC ............ *H04W 16/24* (2013.01); *H04W 24/10* (2013.01); *H04W 52/143* (2013.01); *H04W 52/40* (2013.01); *H04W 72/0446* (2013.01); *H04W 72/0453* (2013.01)

(58) Field of Classification Search
CPC ............... H04W 52/143; H04W 52/40; H04W 72/0446; H04W 72/0453
See application file for complete search history.

(56) References Cited

U.S. PATENT DOCUMENTS

| | | | |
|---|---|---|---|
| 2007/0211757 A1* | 9/2007 | Oyman | H04L 45/122 370/468 |
| 2014/0237547 A1 | 8/2014 | Bose | |
| 2014/0334352 A1* | 11/2014 | Hu | H04W 16/18 370/280 |
| 2015/0029983 A1* | 1/2015 | Kimoto | H04W 24/02 370/329 |
| 2015/0156654 A1 | 6/2015 | Trott et al. | |
| 2015/0245374 A1* | 8/2015 | Mitola, III | H04W 16/14 370/329 |
| 2015/0327148 A1 | 11/2015 | Agarwal et al. | |
| 2015/0333852 A1* | 11/2015 | Yoshizawa | H04W 52/244 370/252 |
| 2015/0349996 A1 | 12/2015 | Vilaipornsawai et al. | |
| 2017/0202041 A1* | 7/2017 | Qin | H04J 13/0062 |

* cited by examiner

SAS CONTROLLED INTERFERENCE MANAGEMENT

BACKGROUND

The disclosure relates to the field of wireless communications, including control and operation of network connections to mitigate interference between mobile network operators.

BRIEF DESCRIPTION OF THE DRAWINGS

Various embodiments of the disclosure will be understood more fully from the detailed description given below and from the accompanying drawings of various embodiments of the disclosure.

DESCRIPTION OF EMBODIMENTS

Figure 1:
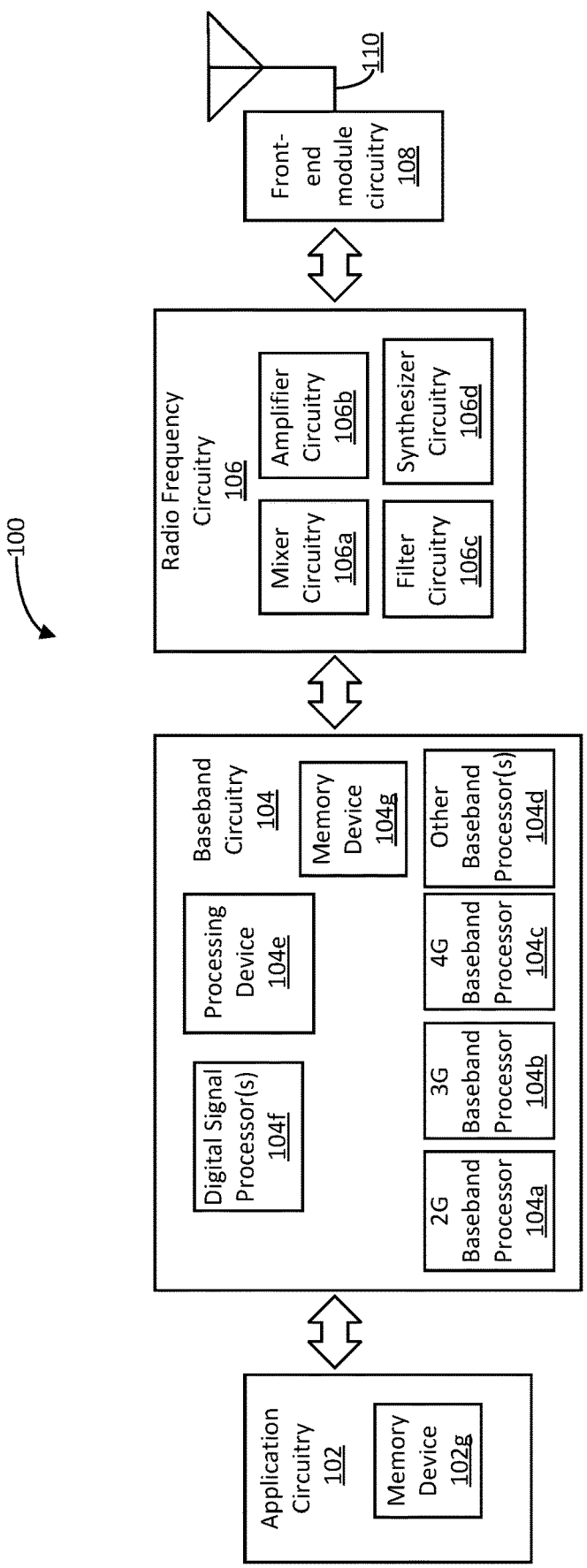
FIG. 1 is a block diagram illustrating example components of an electronic device implementing aspects of the disclosure, according to an embodiment.

Techniques to enable Spectrum Access System (SAS) controlled interference management are disclosed herein. The SAS may govern and manage access to radio frequency bands of an electromagnetic spectrum, also referred to as spectrum. For instance, a service entity makes an application to the SAS by listing Priority Access Licenses (PALs) it is interested in. The entity may request from the SAS a specific PAL that identifies both a frequency range and a geographic area (e.g., census tract, zip code, neighborhood name, etc.) to be accessed. For example, the specific PAL requested by the entity may identify 10 MHz of spectrum in a specific census tract. Generally, census tracts are geographic areas that have approximately 4000 residents and boundaries that follow visible features.

In some situations, similar spectrum sharing based systems (such as the European Licensed Shared Access) are currently defined for specific bands (3.55-3.7 GHz for SAS and 2.3-2.4 GHz for LSA) but they can be adapted for usage in any other suitable frequency band in the future from 0-300 GHz and above and for any suitable bandwidth (10 MHz, 20 MHz, 100 MHz, any (integer) multiples of such bandwidths, etc.). In embodiments, SAS PAL bands (as well as LSA licensed bands) may rely on licensed systems (such as LTE, etc.) with additional provisions required by the (SAS) spectrum sharing system (e.g., access to the SAS entity, protection of incumbent, etc.) and SAS GAA bands (does not exist in European LSA context) may relay on unlicensed systems (such as WiFi, MuLTEfire, etc.) with additionals provisions required by the (SAS) spectrum sharing system (e.g., access to the SAS entity, protection of incumbent, etc.); however, even GAA can possibly build on licensed systems, possibly operating jointly systems which are building on licensed systems and unlicensed systems with additionals provisions required by the (SAS) spectrum sharing system (e.g., access to the SAS entity, protection of incumbent, etc.). Any of the radio links may operate according to any one or more of the following radio communication technologies and/or standards, including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP LTE-Advanced Pro, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), future 5G ($5^{th}$ Generation Systems), etc.

In many situations, spectrum is shared by the entities in several discrete dimensions including: frequency and geography. For instance, the SAS may employ spectrum sharing in the same frequency band but in different geographical areas. These geographical areas could be defined as different markets or defined by geographic exclusion zones that to prohibit specific activities in a specific geographic area. The spectrum is shared because communications spectrum is scarce, and the demand is growing everyday due to the multitude of new Internet access points and devices consuming vastly more bandwidth.

In some situations, the same PAL may be allocated to two different entities independently of each other. For example, a census tract (e.g., a geographic area) for which a PAL license is auctioned independently of other census tracts may have a neighboring census track with a different PAL owner. In one such case, a PAL Owner is Mobile Network Operator (MNO) "A" having obtained the PAL license in census tract "1" and it is surrounded by MNO "B", "C" and "D" having obtained the PAL license in an identical frequency band for census tract "2", "3" and "4". A similar case may exist for General Authorized Access (GAA) spectrum, such as the deployment of Citizens Broadband Service Devices (CBSDs)/Base Stations (BS)/evolved Node Bs (eNB)s/access points (APs)/etc., may be allocated by different stakeholders from one census tract to another.

In a typical case, an SAS can allocate specific frequencies (e.g., channels) that may not be the same in all the census tracts. The distributed allocation of PAL licenses for the specific frequencies (similar for GAA system deployment) relates to the needs of a particular business (or any business with multiple sites), such as a restaurant chain. In such a case, the concerned business owner may apply for a PAL license for only those census tracts in which their business is located. This can enable the business owner to provide preferred access to its customers.

While a business owner may acquire one channel for the PAL license in the census tract, the channels in neighboring census tracts may be owned by other stakeholders. For example, in one census tract a given 10 MHz PAL license (similar for GAA spectrum) is allocated to a specific user (e.g., the business owner indicated above). In the neighboring census tract, the same frequency block may be allocated to another stakeholder, such as a traditional MNO. Typically, those two stakeholders prefer not to exchange any (e.g., detailed) configuration information for performing interference management or similar.

In some situations, a coordination mechanism may be used to share spectrum between disparate systems that operate within the same spectrum band. In one example, the coordination mechanism may rely on coexistence infrastructure that knows how a particular swath of spectrum is being used by a primary user in a known geographic area and uses this knowledge to manage spectrum access by all other users. In general, this type of coordination mechanism approach to spectrum sharing may be unable to achieve interference mitigation in an identical frequency band with non-cooperating equipment infrastructure situated between neighboring cells. Each cell may include a network object, such as a base station, that can be uniquely identified by user equipment from a (cell) identifier that is broadcasted over a geographical area from a network access point.

Embodiments of the disclosure describe techniques to provide a SAS controlled spectrum allocation mechanism between census tracts to manage interference between the tracts. In some embodiments, a cell based interference mitigation mechanism is provided. The mechanism may generate protected spectrum bands (also referred to herein as protection bands) for interference-limited/interference-free transmissions in cell/census tracts. The protection bands are interference-free channels that protect equipment used in neighboring cells from interfering with each other. For this purpose, specific time slots and/or transmission power levels are coordinated among neighboring cells such that various levels of interference protection are provided. Depending on particular MNO requirements and/or quality of service agreements, equipment of the MNO used with a certain cell may be configured to use particular time slots for additional interference protection. For example, an MNO can select suitable frequency blocks, as well as PAL or GAA usage time slots, for a specific edge/center of a cell to mitigate interference therein. Thus, the interference levels amongst a given two MNOs can be minimized without the need to exchange information between the two.

FIG. 1 is a block diagram illustrating example components of an electronic device 100. In embodiments, the electronic device 100 may be, implement, be incorporated into, or otherwise be a part of a user equipment (UE), an evolved NodeB (eNB), an infrastructure node, an aggregation node, or one or more elements of a SAS. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or one or more software or firmware modules may implement functions associated with the circuitry. In some embodiments, circuitry may include logic, at least partially operable in hardware.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The application circuitry 102 may further include memory/storage device 102g. The memory/storage device 102g may be used to load and store data (e.g., data sequences) and/or instructions for operations performed by the one or more application processors of the application circuitry 102. The memory/storage device 102g may include a non-transitory machine-accessible storage medium on which is stored software implementing any one or more of the methodologies of functions described herein. Memory/storage for one embodiment may include any combination of suitable volatile memory and/or non-volatile memory. The memory/storage device 102g may include any combination of various levels of memory/storage including, but not limited to, read-only memory (ROM) having embedded software instructions (e.g., firmware), random access memory (e.g., dynamic random access memory (DRAM), cache, buffers, etc. The memory/storage device 102g may be shared among the various processors or dedicated to particular processors.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A processing device 104e of the baseband circuitry 104 may be configured to run elements of the protocol stack for signaling of the PHY, MAC, RLC, PDCP and/or RRC layers. The processing device 104e may represent one or more general-purpose processing devices such as a microprocessor, processor, central processing unit, or the like. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage device 104g. The memory/storage device 104g may be used to load and store data and/or instructions for operations performed by the processing device 104e of the baseband circuitry 104. The memory/storage device 104g may include a non-transitory machine-accessible storage medium on which is stored software implementing any one or more of the methodologies of functions described herein. Memory/storage for one embodiment may include any combination of suitable volatile memory and/or non-volatile memory. The memory/storage device 104g may include any combination of various levels of memory/storage including, but not limited to, read-only memory (ROM) having embedded software instructions (e.g., firmware), random access memory (e.g., dynamic random access memory (DRAM), cache, buffers, etc. The memory/storage device 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN).

Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, the voltage-controlled oscillator (VCO) provides frequency input, although that is not a requirement. Either the baseband circuitry 104 or the applications processor 102 depending on the desired output frequency may provide divider control input. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD can divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

Figure 2:
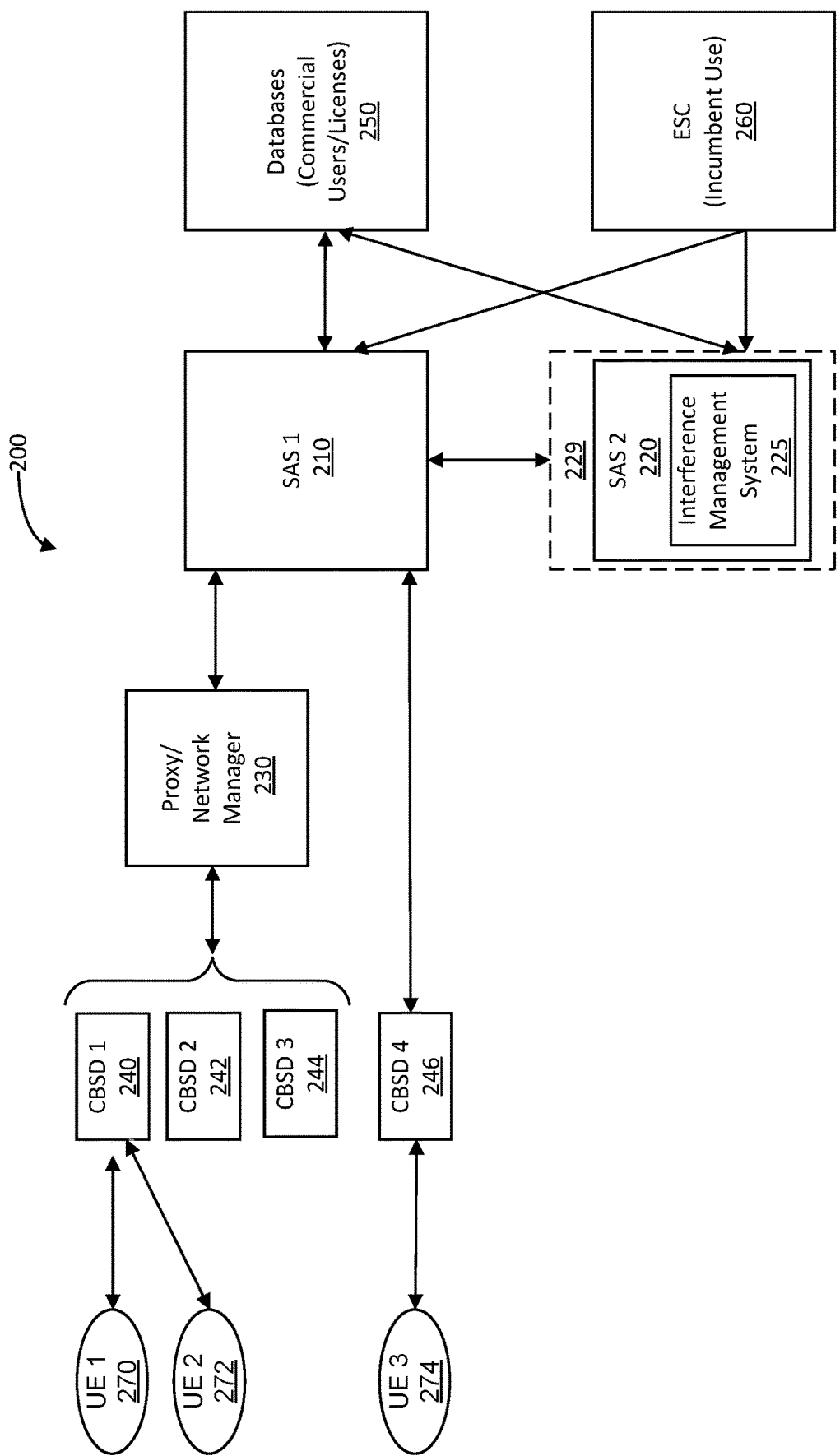
FIG. 2 is a block diagram illustrating example components of a system for implementing interference mitigation options, according to an embodiment.

Embodiments described herein may be implemented into a system using any suitably configured hardware and/or software. FIG. 2 illustrates, for one embodiment, example infrastructure components of a system 200 for implementing interference management methods as described herein. In some embodiment, the system may represent an example of a LTE infrastructure comprising a plurality of infrastructure nodes. For example, the system 200 includes various infrastructure components, such as a plurality of SASs (e.g., SAS 1 210 and SAS 2 220), which may be used to coordinate spectrum use between incumbent federal users, PAL (Priority Access License) Users and GAA (General Authorized Access) Users . . . ). In some embodiments, the SAS component, such as SAS_2 220 may be comprised in a master infrastructure component 229, such as an eNB.

In some embodiments, the SASs (210, 220) may coordinate spectrum sharing within the system 200 in the 3.5 GHz band by use of a three-tiered sharing system. In some embodiments, an order of priority in the three-tiered sharing system may include (1) incumbent licensees; (2) PA licensees; and (3) GAA operators. The first and highest tier ("Tier 1") includes incumbent federal users and fixed satellite service ("FSS") operators. The second tier ("Tier 2") includes PAL users that may be authorized to use an unpaired 10 MHz channel of a certain range in a geographic service area (e.g., census tract) for a determined time period. The third tier ("Tier 3") includes GAA operators that are permitted access to 80 MHz of a 3.5 GHz band that is not assigned to a higher tier. Equipment used in the GAA band may be used without obtaining an individual spectrum license. The SASs is central to coordinating spectrum in the 3.5 GHz band, and tier 2 or tier 3 devices may not operate unless they are in communication with the SASs (210, 220) and receive information as to when and where to use 3.5 GHz channels.

In cases when there is a plurality of SASs, such as in system 200, they may be synchronized with each other. The SAS operates as a central coordinator for spectrum within the system 200 and includes substantial information about the network and devices that are used therein. In some embodiments, the SAS (e.g., 210, 220) is used to facilitate spectrum sharing within system 100. In one situation, the system 200 may dedicate frequency bands for sharing spectrum. For example, the system 200 may employ a proxy/network manager 230 that can accept a set of one or more available channels in the 3.5 GHz and select channels for use by specific CBSDs 240-246. In some embodiments, the system 200 also includes User Equipment (UE) 270-274, (e.g., cellular mobile devices, modems, etc.) that are controlled by an authorized CBSD and have the capability to receive and decode information from the CBSDs 240-246.

In some embodiments, the SAS, such as SAS_1 210 and SAS_2 220, may communicate allowed frequencies of operation, permitted transmit power levels and duration at a designated location upon request from a registered and authenticated CBSD. The CBSDs 240-246 would not be permitted to operate without registration of location and connection to an authorized database 250. In order to operate within bands designated for sharing spectrum, registered CBSDs 240-246 must have the capability to geolocate in three dimensions (3D) in near real time with high accuracy for the SAS to be able to provide them with an accurate set of allowed channels in a timely manner (i.e., on the order of seconds). In other situations, the system 200 may implement an Environmental Sensing Capability ("ESC") system 260 that detects and communicates with the presence of a signal from an incumbent federal user to an SAS to facilitate shared spectrum access and use in and adjacent to the 3.5 GHz band.

In some situations, interference may occur between infrastructure components of system 200 because of the sharing spectrum in the system. This type of interference can occur when two or more systems operate in the same geographic area and are transmitting on the same frequency. To mitigate interference, the system 200 may include an interference management system 225. For example, the interference management system 225 may be disposed on an entity node of system 200, such as SAS_2 220. In some embodiments, the interference management system 225 may include more components that what is shown with these components being geographically dispersed.

In some embodiments, the interference management system 225 of SAS 220 collects data on communication interference by interacting with network equipment (e.g., eNBs, etc.) as well as UEs 270-274 (e.g., terminal/mobile devices performing certain measurements) to receive interference measurements based on various interference events or communication tests. For example, when user equipment, such as UEs 270-274, enters the LTE network of system 200, they may perform a cell search to detect cell identifiers (IDs) of potential base stations or eNBs in the area. The UEs 270-274 may also perform measurements on each detected cell to report reference signal receive power (RSRP) and related Reference Signal Receive Quality (RSRQ) to the eNBs. Once the UE has established a connection to an eNB, data reception is possible, and feedback information sent from the UE to the serving eNB include interference measurements.

Based on the obtained measurements or other information, such as current network configuration setting, provided by the components, the interference management system 225 of SAS_2 220 identifies interference-free channels and creates SAS protection bands that can be used for interference-free transmissions within system 200. The protection bands are used protect equipment used in neighboring cells from interfering with each other. For example, the interference management system 225 may generate a protection band to mitigate interference between cell/census tracts. In some embodiments, the interference management system 225 creates specific time slots for using spectrum of the protection band. The SAS coordinates these time slots amongst neighboring cell/census tracts such that levels of interference protections are provided for the various infrastructure components of system 200.

Figure 3:
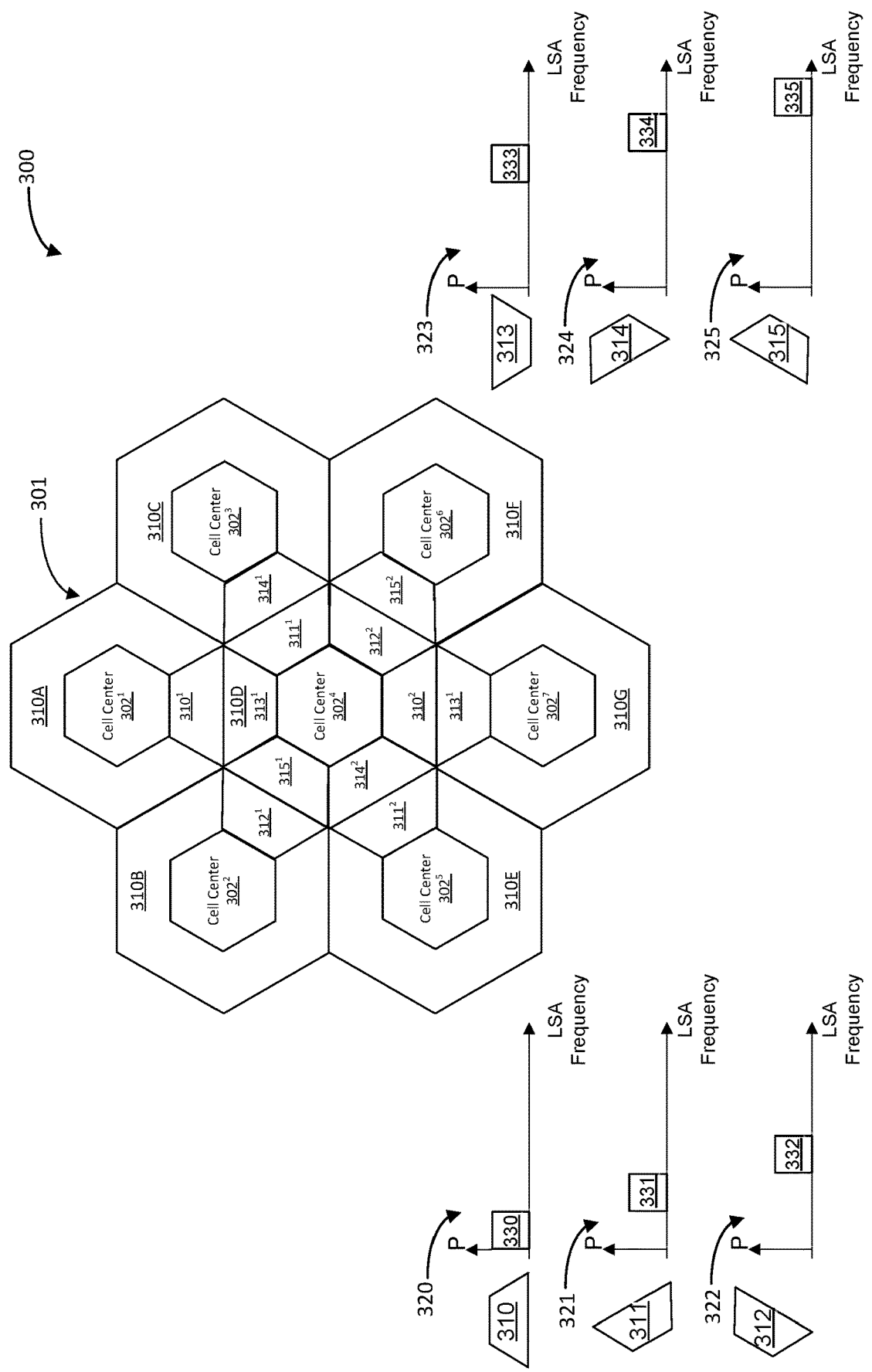
FIG. 3 is a block diagram illustrating an example of components and communications in a network infrastructure, according to an embodiment.

FIG. 3 is a block diagram illustrating an example 300 of components and communications in a network infrastructure 301, according to an embodiment. In this example, parts of the network infrastructure 301 to support various census tracts are shown. For example, census tracts include a plurality of neighboring cells, such as cells 310A-G, that are associated with a census tract to use specific spectrum. Each cell includes a cell-center, such as cell-centers $320^{1-7}$, that may include, for example, radio access infrastructure nodes, such as a Base Station. The infrastructure nodes operate in licensed and unlicensed spectrum within a determined distance from an approximate geographic center of the corresponding census tract.

In some embodiments, each cell-center is split into a certain amount of orthogonal sectors or bands arranged around the cell-center. For example, the cell-center $302^4$ associated with cell 310D includes orthogonal sectors $313^1$, $311^1$, $312^2$, $310^2$, $314^2$ and $315^1$. Although each census tract in FIG. 3 is shown split into a certain amount of orthogonal sectors (e.g., 6-sector split), other sector arrangements sectors are possible to combine two (neighboring) sectors within the same cell-center in order to finally achieve a 3-sector, 2-sector or 1-sector split, etc. For example, three sectors associated with a given cell-center can be combined, such as combining sectors $313^1$, $311^1$, $315^2$ together and $310^1$, $314^1$, $312^2$ together, thus a 2-sector split can be achieved for that census tract.

The techniques described herein provide a SAS-controlled spectrum allocation management system to manage interference between neighboring cells. In some embodiments, the SAS allocates frequencies across neighboring cells so that a maximum geographic (Euclidian) distance is achieved between census tracts in which identical frequency blocks are used. This arrangement of frequencies provides as much separation as possible between sectors operating with identical frequency. In this regard, a single frequency can be applied for a given cell-edge, such as orthogonal sectors $310^{1-2}$, $311^{1-2}$, $312^{1-2}$, $313_{1-2}$, $314^{1-2}$ and $315^{1-2}$, with (preferably) no neighboring cell-edge applying the same frequency.

In some embodiments, the SAS coordinates specific time slots for equipment (e.g., infrastructure components) used in neighboring cell-edges such that various levels of interference protection are provided. For example, the equipment used in a particular cell-edge can be configured to be used time slots of high/medium/low levels of interference protection. In this regard, an SAS entity comprising the interference management system 225 of FIG. 2, such as SAS_2 220, may select suitable frequency blocks as well as PAL or GAA usage time slots for specific cell-edges to mitigate interference therein between. As noted above, the SAS collects data on interference measurements between various components of the network infrastructure 301, based on the obtained measurements the SAS identifies interference-free channels and creates SAS protection bands which can be used for interference-free transmission.

To identify the interference-free channels, the SAS may generate a type of triggering signal referred to as a Best Link Indicator (BLI). The BLI signal carries information on the best link, such as a link with a minimum threshold level of interference, for target network equipment, such as a BS. The BLI signal may comprise log 2 (n) number bits, where n is the number of available transmission links (e.g., communication frequency channels) associated with a particular the target network equipment. The BLI can be exchanged by a number of the target network equipment within a Localized Service Area (LSA), or within an operator-defined group of cells. For example, network base stations associated with the cells may exchange the BLI and select the best transmission link according to RSRP/RSRQ measurements and Channel Quality Indicator (CQI)/Pre-coding Matrix Index (PMI) feedback that may comprise Signal-to-Noise-and-Interference Ratios (SINR), or terminals (e.g., UEs) that select the best transmission link through a channel from interfering UEs or received SINR.

In alternative embodiments, other techniques for obtaining a BLI may be employed. For example, the SAS entities may have access to configuration information and/or measurements from network equipment (through direct interaction) and/or from incumbents (through direct interaction or by information provided by the Environmental Sensing Capability). In addition, information exchanged between various distinct SAS entities may apply. After getting the configuration information and measurements, the SAS may send configuration data to infrastructure components of the network infrastructure 300 to coordinate available transmission links between cell-edge users. In some embodiments, the configuration data assigns interference-free channels, for example, to equipment in a census tract experiencing severe interference (e.g., cell-edge UEs), or to equipment in census tracts experiencing high user load, and for emergency information for cell-edge UEs.

In some embodiments, the SAS may assign a LSA frequency for each cell edge to use in a particular protection band. In some embodiments, the protection bands 330-335 are arranged so that each cell is on a different non-overlapping LSA frequency to protect the bands from interfering with each other. For example, as shown in graphs 320-325 of FIG. 3, the SAS may provide configurations settings to infrastructure components of network infrastructure 301 so that cell-edge 310 uses protection band 330, the cell-edge 311 uses protect band 331, the cell-edge 312 uses protect band 332, the cell-edge 313 uses protect band 333, the cell-edge 314 uses protect band 334 and the cell-edge 315 uses protect band 335. In some embodiments, the output power level (P) of the equipment in the cell-edges may the same or different based on the configuration setting provided by the SAS.

To further control interference for the protection bands, the SAS may employ several techniques. In one example, the protection bands may be based on maximum separation between the census tracts that use the same bands. For example, as shown in FIG. 3, the SAS may provide configurations settings to infrastructure components of network infrastructure 301 so that cell-edge $310^1$ uses the same band as cell-edge $310^2$, $311^1$ uses the same band as cell-edge $311^2$, cell-edge $312^1$ uses the same band as cell-edge $312^2$, cell-edge $313^1$ uses the same band as cell-edge $313^2$, cell-edge $314^1$ uses the same band as cell-edge $314^2$ and cell-edge $315^1$ uses same band as cell-edge $315^2$. In this example, the SAS arranges the band use so that the geographic distance between the cell-edges is set to a certain maximum threshold distance.

Figure 4:
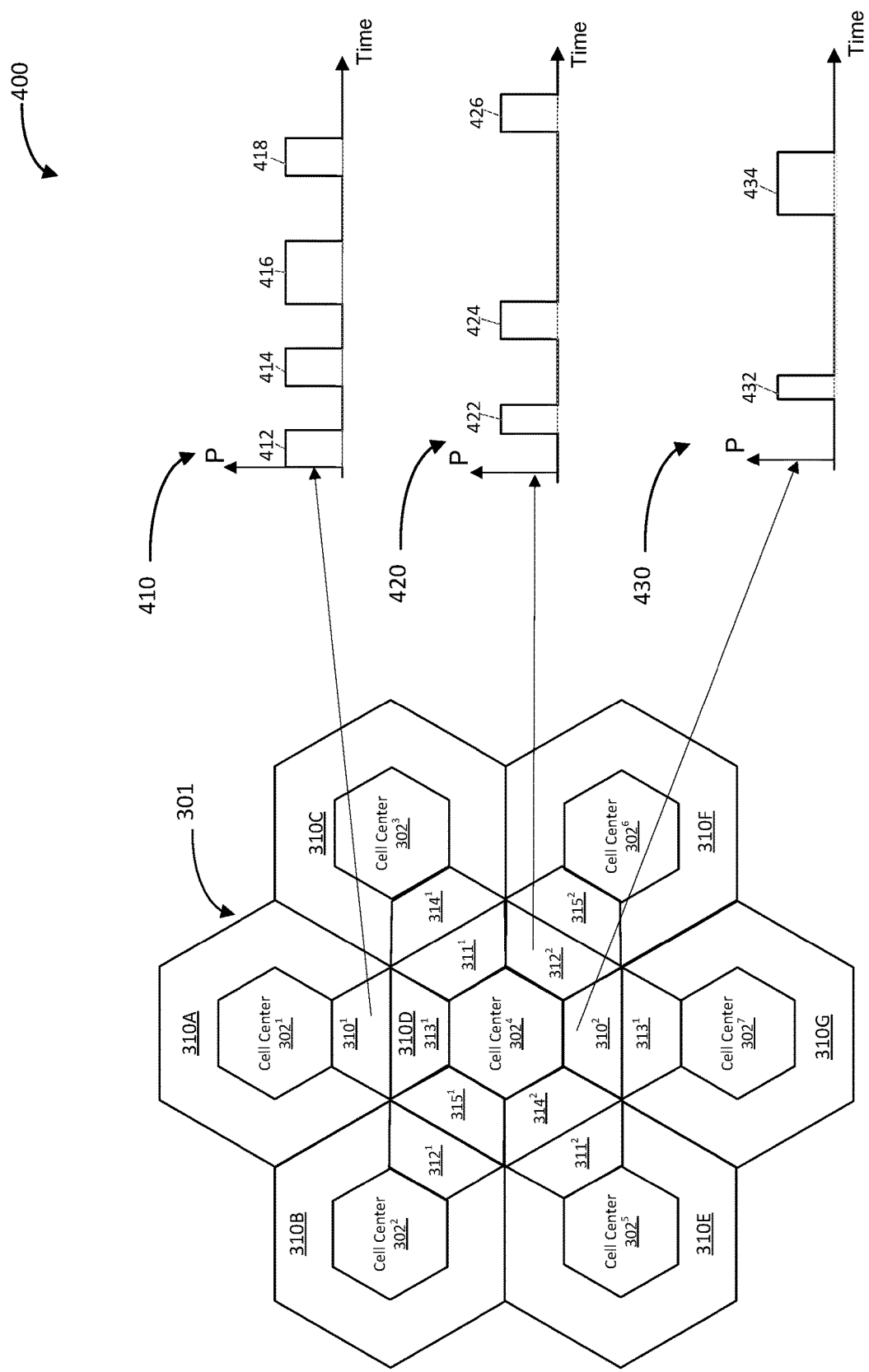
FIG. 4 is a block diagram illustrating another example of components and communications in the network infrastructure of FIG. 3, according to an embodiment.

FIG. 4 is a block diagram illustrating another example 400 of components and communications in the network infrastructure 301 of FIG. 3, according to an embodiment. In this example, the SAS may switch on/off certain cell-edges so that there is a time separation between the use of equipment in nearby cell sectors and cell sectors that are using the same bands. For example, as shown in graphs 410-430 the SAS may provide configurations settings to infrastructure components of network infrastructure 301 so that cell-edge $310^2$ use its protection band times, such as time 432 and 434, that are different from the times (e.g., times 422, 424 and 426) used by neighboring cell-edge $312^1$ and at the times (e.g., times 412, 414, 416 and 418) used by cell-edge $310^1$ in which that same band is used.

Figure 5:
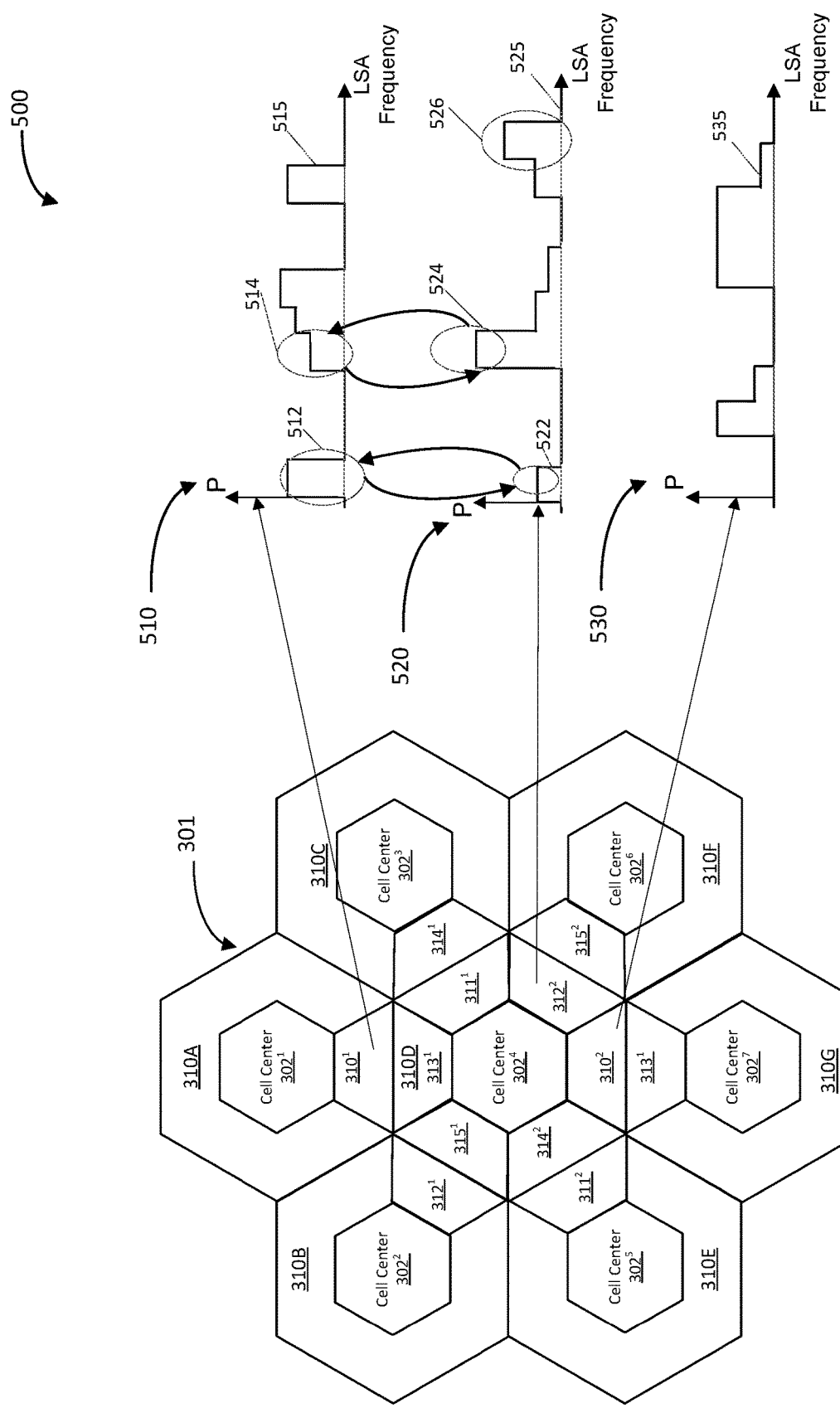
FIG. 5 is a block diagram illustrating yet another example of components and communications in the network infrastructure of FIG. 3, according to an embodiment.

FIG. 5 is a block diagram illustrating yet another example 500 of components and communications in the network infrastructure 301 of FIG. 3, according to an embodiment. In this example, the SAS may identify one or more buffer zones 512, 514, 522, 524 and 526 in order to create a separation between neighboring equipment under the control of distinct stakeholders. For example, the buffer zone may indicate a separation or difference in the power level setting for equipment in neighboring cells that use the same protection band (e.g., frequency). For example, as shown in FIG. 5, the power level of equipment in cell $310^1$ illustrated in graph 510 are set to a certain level with buffer zone 512 while the equipment of $312^2$ (which uses the same protection band) is illustrated in graph 520 as set to a lower level within buffer zone 522. In this regard, the SAS may employ PAL spectrum to create a buffer between neighboring cells where different stakeholders operate in identical spectrum. In some embodiments, the SAS may use GAA spectrum for such buffer zones in order to create a separation in transmission power levels for operating neighboring equipment under the control of distinct stakeholders.

Such buffer zones 512, 514, 522, 524 and 526 can also be identified and allocated by the SAS using several techniques. In one embodiment, the SAS may identify interfering events through certain measurements (such as measurements of decoding performance, measurement of SINR levels, etc.) and the corresponding geographic areas where interference events are substantial ("interfering zone"). In the "interfering zone", the SAS may apply a different spectrum allocation by allocating a different PAL or GAA slot. UE inside this zone may be handed-off to the locally allocated PAL or GAA spectrum. In other embodiments, the SAS may identify certain interference levels. If the interference levels are too high (e.g., exceeding a predefined threshold), the size of the buffer zone is increased, e.g., the difference between the transmission power levels of equipment between two cell edges is increased. If the interference level falls below a lower threshold, then the size buffer zones, such as zones 512, 514, 522, 524 and 526, are reduced. In this regards, the difference between the transmission power levels of equipment between the two cell edges is decreased.

As shown in graphs 510, 520 and 530 of FIG. 5, the cell-edges transmissions are not only switched on/off, but also various levels of transmission power level P (such as power levels 515, 525, 535 may be adjusted over time for each cell-edge. The levels of output power P 515, 525, 535 are attributed to cell-edge UE that are managed across neighboring census tracts through the existing SAS infrastructure. Moreover, a trade-off between interference levels and capacity is possible by setting different output power levels in neighboring census tracts using the same frequency. In one sector, a high output power level can be applied while a lower level can be applied in the other one. This allows for a highly interference free channel in one cell and some interference controlled (but not interference free) channel in the other census tracts. This allows the SAS to allocate services to specific users depending on the needs. Alternatively, the interfered spectrum can be used for low-cost services or services with a limited level of Quality of Service (QoS) requirements.

Figure 6:
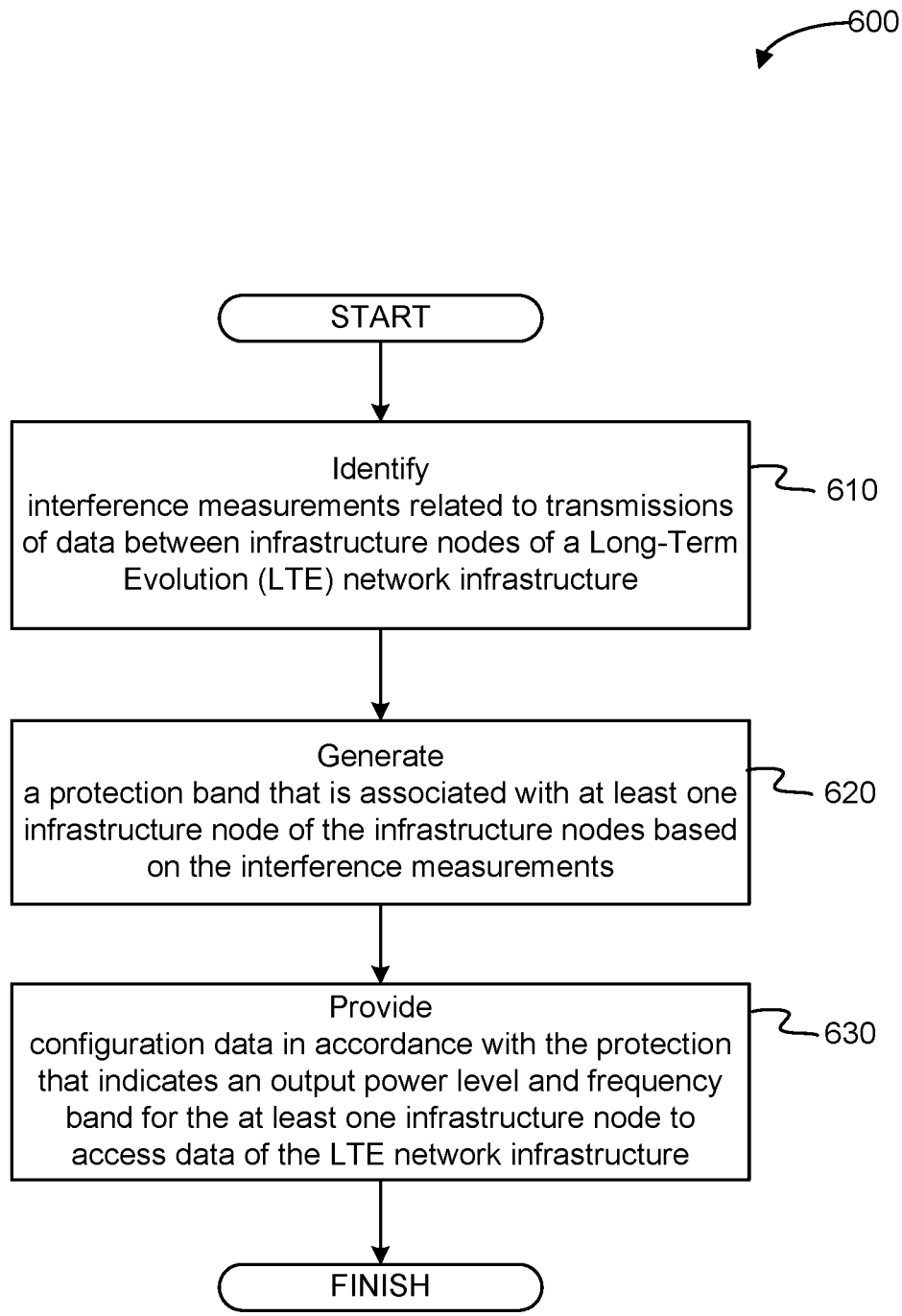
FIG. 6 illustrates a flowchart of an example method of creating interference protection bands in a network infrastructure, according to an embodiment.

FIG. 6 illustrates a flowchart of an example method 600 of creating interference protection bands in a network infrastructure, according to an embodiment. Method 600 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 600. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 600 begins in block 610 where interference measurements related to transmissions of data between infrastructure nodes of a Long-Term Evolution (LTE) network infrastructure are identified. For example, the electronic device, such as SAS 220 of FIG. 2, may receive measurements of interference between neighboring cells in the LTE network infrastructure. In block 620, a protection band is created based on the interference measurements. For example, the SAS may identify interference-free channels based on the interference measurements in block 610 that protect equipment used in neighboring cells from interfering with each other. The protection band is associated with at least one infrastructure node of the infrastructure nodes. Configuration data is provides in accordance with the protection band in block 630. The configuration data indicates an output power level and frequency band for the at least one infrastructure node to access data of the LTE network infrastructure.

Figure 7:
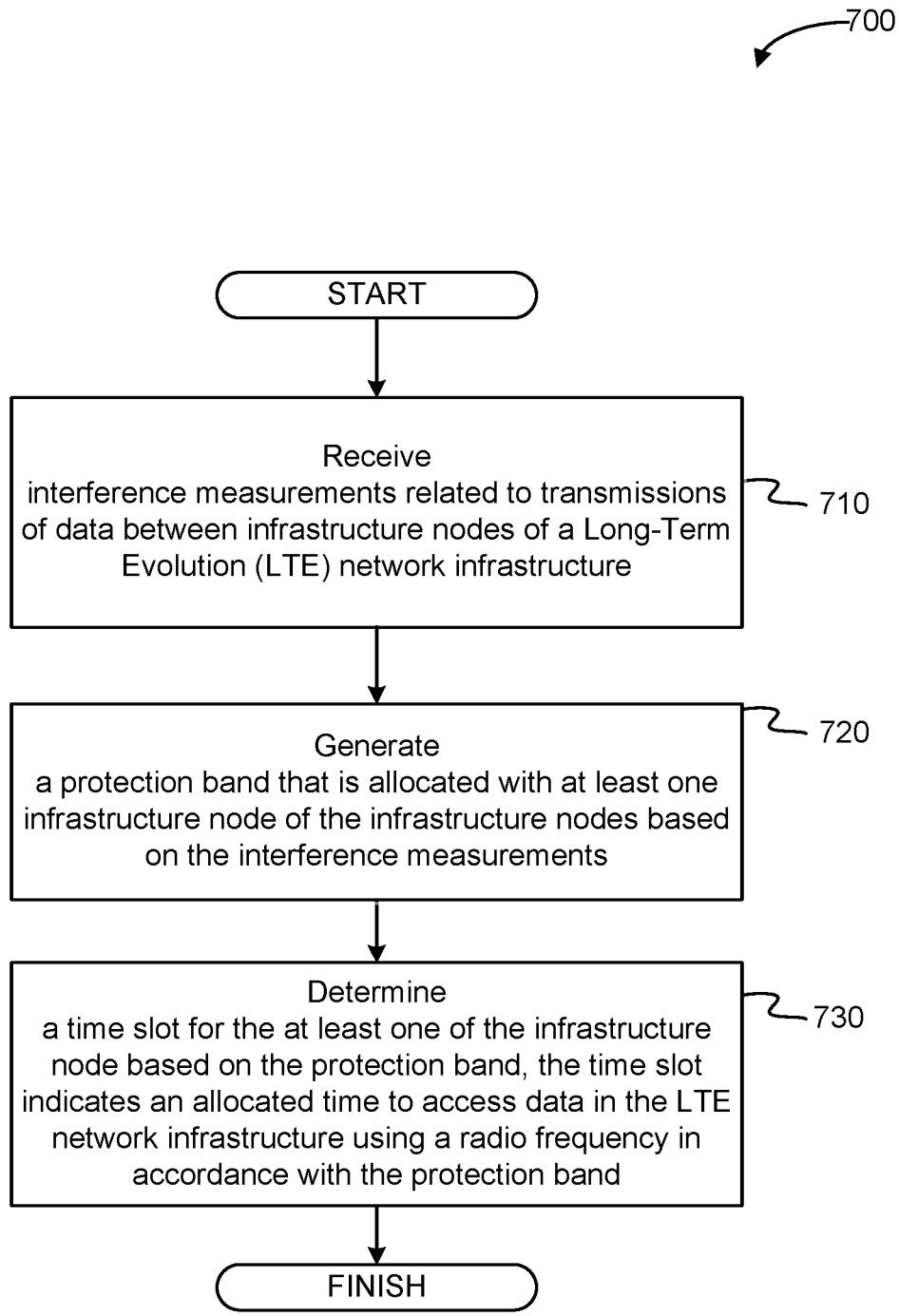
FIG. 7 illustrates a flowchart of another example method of creating interference protection bands in a network infrastructure, according to an embodiment.

FIG. 7 illustrates a flowchart of an example method 700 of creating interference protection bands in a network infrastructure, according to an embodiment. Method 700 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 700. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 700 begins in block 710 where interference measurements related to transmission of data between infrastructure nodes of a Long-Term Evolution (LTE) network infrastructure are received. For example, the electronic device, such as SAS 220 of FIG. 2, may receive measurements of interference between neighboring cells in the LTE network infrastructure. In block 720, a protection band is generated based on the interference measurements. For example, the SAS may identify interference-free channels based on the interference measurements in block 610 that protect equipment used in neighboring cells from interfering with each other. The protection band is allocated to at least one of the infrastructure node of the LTE network infrastructure. A time slot for the at least one of the infrastructure node is determined based on the protection band. The time slot indicates an allocated time frame to access data in the LTE network infrastructure using a radio frequency in accordance with the protection band.

Figure 8:
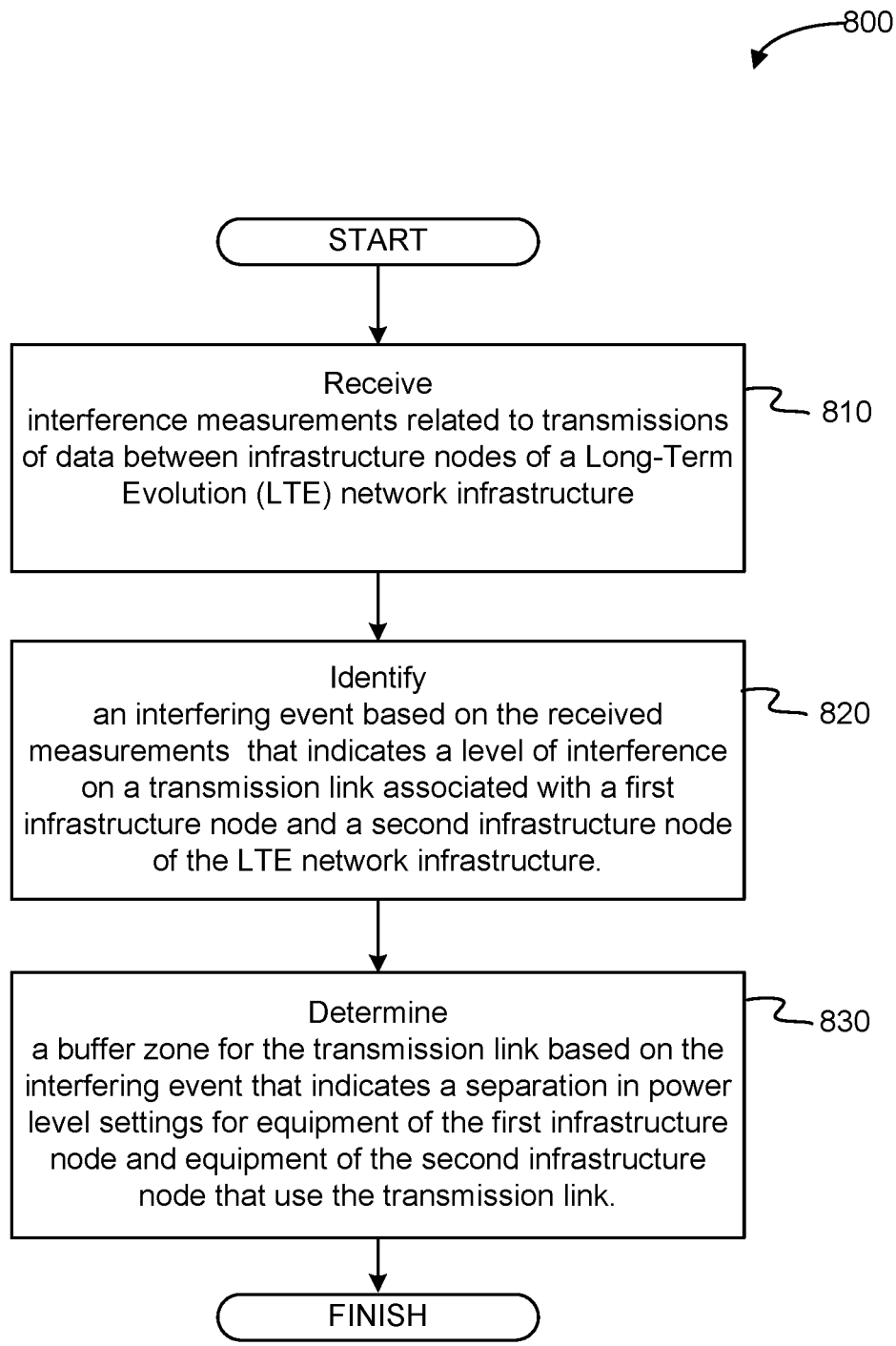
FIG. 8 illustrates a flowchart of yet another example method of creating interference protection bands in a network infrastructure, according to an embodiment.

FIG. 8 illustrates a flowchart of an example method 800 of creating interference protection bands in a network infrastructure, according to an embodiment. Method 800 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 800. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 800 begins in block 810 where measurements related to transmission links associated with infrastructure nodes of a Long-Term Evolution (LTE) network infrastructure are received. For example, the electronic device, such as SAS 220 of FIG. 2, may receive measurements of interference between neighboring cells in the LTE network infrastructure. In block 820, an interfering event is identified based on the received measurements. The interfering event indicating a level of interference on a transmission link associated with a first infrastructure node and a second infrastructure node of the LTE network infrastructure. In block 830, a buffer zone for the transmission link is determined based on the interfering event. The buffer zone indicating a separation in power level settings for equipment of the first infrastructure node and equipment of the second infrastructure node that use the transmission link.

Figure 9:
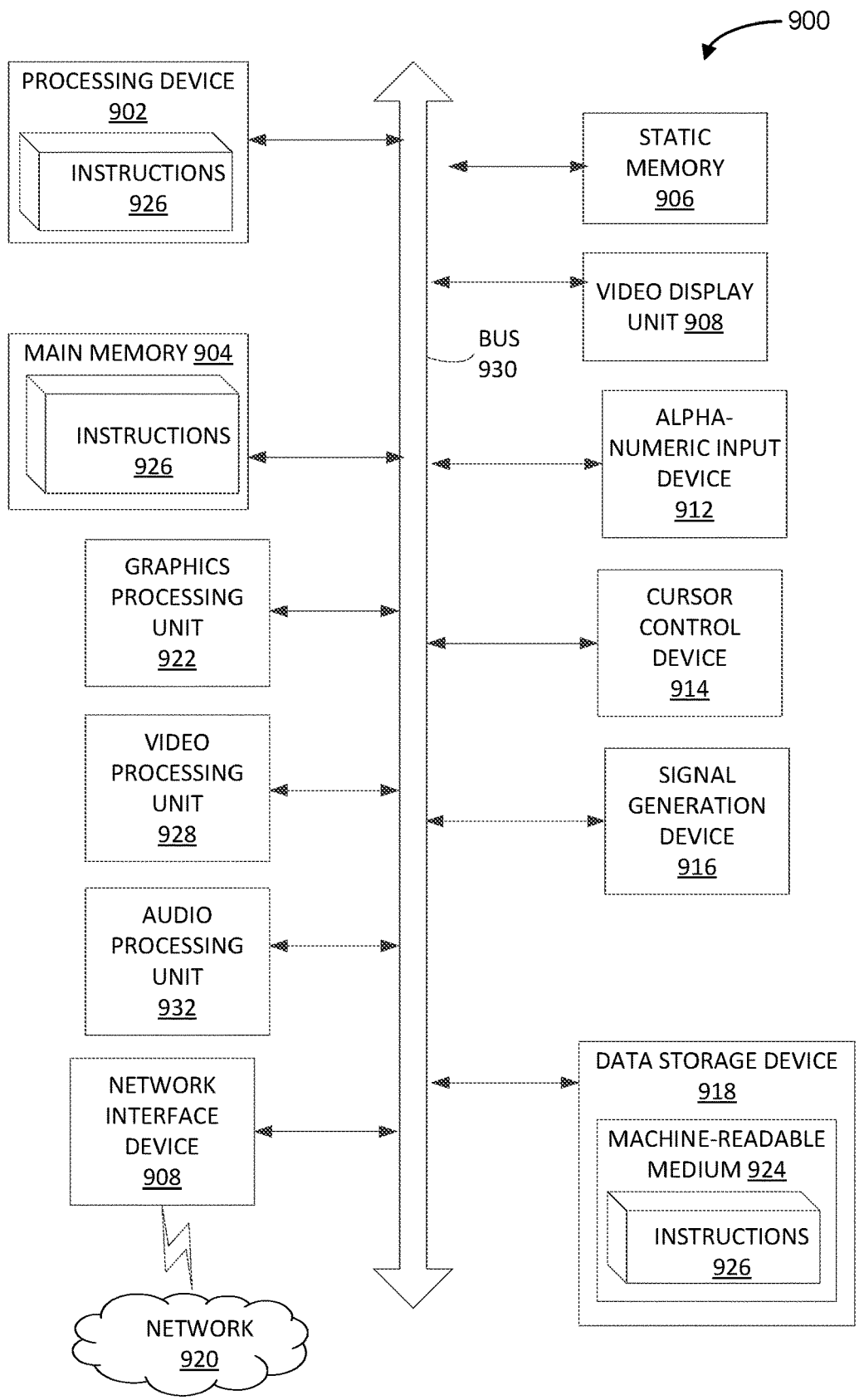
FIG. 9 illustrates a block diagram illustrating a machine in which an embodiment of the disclosure may be used.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processing cores. The processing device 902 is configured to execute the processing logic 926 for performing the operations and steps discussed herein. In one embodiment, processing device 902 is the same as processing device 104e described with respect to FIG. 1 that implement techniques for providing SAS controlled interference management as described herein with embodiments of the disclosure.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker). Furthermore, computer system 900 may include a graphics processing unit 922, a video processing unit 928, and an audio processing unit 932.

The data storage device 918 may include a machine-accessible storage medium 924 on which is stored software 926 implementing any one or more of the methodologies of functions of the interference management system 225 as described herein, such as implementing techniques for providing SAS controlled interference management on threads in a processing device as described above. The software 926 may also reside, completely or at least partially, within the main memory 904 as instructions 926 and/or within the processing device 902 as processing logic 926 during execution thereof by the computer system 900; the main memory 904 and the processing device 902 also constituting machine-accessible storage media.

The machine-readable storage medium 924 may include a non-transitory machine-accessible storage medium that is used to store instructions 926 implementing techniques for providing SAS controlled interference management on threads in a processing device such as described with respect to processing device 100 in FIG. 1, and/or a software library containing methods that call the above applications. While the machine-accessible storage medium 928 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations.

The following examples pertain to further embodiments.

Example 1 may include an apparatus for an evolved Node B (eNB) comprising: a memory to store network configuration data; and one or more processing devices coupled to the memory, the processing devices to: generate a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and determine a time slot for the at least one of the infrastructure node based on the protection band, the time slot indicates an allocated time frame to access data in the LTE network infrastructure using a radio frequency in accordance with the protection band.

Example 2 may include the apparatus for the eNB of Example 1, further comprising a Spectrum Access System (SAS) node.

Example 3 may include the apparatus for the eNB of Example 1, further comprising radio frequency circuitry to transmit configuration settings related to time slot to the at least one of the infrastructure node.

Example 4 may include the apparatus for the eNB of Examples 2 or 3, wherein the processing devices are further to generate a triggering signal to measure interference levels associated with the infrastructure nodes of the LTE network infrastructure.

Example 5 may include the apparatus for the eNB of Examples 2 or 3, wherein the time slot for the at least one of the infrastructure node is different from a second time slot allocated to a neighboring infrastructure node using the radio frequency.

Example 6 may include the apparatus for the eNB of Example 5, wherein the time slot for the at least one of the infrastructure node is different from a second time slot allocated to a neighboring infrastructure node using the radio frequency.

Example 7 may include the apparatus for the eNB of Examples 2 or 3, wherein the output power level associated with the at least one infrastructure node is different from an output power level assigned to a neighboring infrastructure node.

Example 8 may include the eNB of Examples 2 or 3, wherein a distance between the protection band for the at least one infrastructure node and a second protection band associated with a neighboring infrastructure node meets a determined threshold distance.

Example 9 may include a computer readable storage medium storing executable instructions, that when executed by one or more processing devices, cause the processing devices to: generate, by the processing devices, a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and determine a time slot for the at least one of the infrastructure node based on the protection band, the time slot indicates an allocated time frame to access data in the LTE network infrastructure using a radio frequency in accordance with the protection band.

Example 10 may include the computer readable storage medium of Example 9, wherein the processing devices are associated with an evolved Node B (eNB) included in a Spectrum Access System (SAS) node.

Example 11 may include the computer readable storage medium of Example 9, wherein the processing devices are further to transmit configuration settings related to time slot to the at least one of the infrastructure node.

Example 12 may include the computer readable storage medium of Examples 10 or 11, wherein the processing devices are further to generate a triggering signal to measure interference levels associated with the infrastructure nodes of the LTE network infrastructure.

Example 13 may include the computer readable storage medium of Examples 10 or 11, wherein the processing devices are further to generate a triggering signal to measure interference levels associated with the infrastructure nodes of the LTE network infrastructure.

Example 14 may include the computer readable storage medium of Example 13, wherein the time slot for the at least one of the infrastructure node is different from a second time slot allocated to a neighboring infrastructure node using the radio frequency.

Example 15 may include the computer readable storage medium of Examples 10 or 11, wherein the output power level associated with the at least one infrastructure node is different from an output power level assigned to a neighboring infrastructure node.

Example 16 may include the computer readable storage medium of Examples 10 or 11, wherein a distance between the protection band for the at least one infrastructure node and a second protection band associated with a neighboring infrastructure node meets a determined threshold distance.

Example 17 may include an apparatus comprising: a memory to store network configuration data, and one or more processing devices coupled to the memory, the processing devices to: generate a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and determine a time slot for the at least one of the infrastructure node based on the protection band, the time slot indicates an allocated time frame to access data in the LTE network infrastructure using a radio frequency in accordance with the protection band.

Example 18 may include the apparatus of Example 17, wherein the apparatus is further included in a Spectrum Access System (SAS) node.

Example 19 may include the apparatus of Example 17, further comprising radio frequency circuitry to transmit configuration settings related to time slot to the at least one of the infrastructure node.

Example 20 may include the apparatus of Examples 18 or 19, wherein the processing devices are further to generate a triggering signal to measure interference levels associated with the infrastructure nodes of the LTE network infrastructure.

Example 21 may include the apparatus of Examples 18 or 19, wherein the time slot for the at least one of the infrastructure node is different from a second time slot allocated to a neighboring infrastructure node using the radio frequency.

Example 22 may include the apparatus of Example 21, wherein the time slot for the at least one of the infrastructure node is different from a second time slot allocated to a neighboring infrastructure node using the radio frequency.

Example 23 may include the apparatus of Examples 18 or 19, wherein the output power level associated with the at least one infrastructure node is different from an output power level assigned to a neighboring infrastructure node.

Example 24 may include the apparatus of Examples 18 or 19, wherein a distance between the protection band for the at least one infrastructure node and a second protection band associated with a neighboring infrastructure node meets a determined threshold distance.

Example 25 may include an apparatus comprising: one or more processing devices; means for generating a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and means for determining a time slot for the at least one of the infrastructure node based on the protection band, the time slot indicates an allocated time frame to access data in the LTE network infrastructure using a radio frequency in accordance with the protection band.

Example 26 may include the apparatus of Example 25, further comprising the subject matter of any of Examples 17-24.

Example 27 may include a method comprising: generating, by one or more processing devices, a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and determining, by the processing devices, a time slot for the at least one of the infrastructure node based on the protection band, the time slot indicates an allocated time frame to access data in the LTE network infrastructure using a radio frequency in accordance with the protection band.

Example 28 may include the method of Examples 27, wherein the time slot for the at least one of the infrastructure node is different from a second time slot allocated to a neighboring infrastructure node using the radio frequency.

Example 29 may include the method of Example 27, wherein the time slot for the at least one of the infrastructure node is different from a second time slot allocated to a neighboring infrastructure node using the radio frequency.

Example 30 may include the method of Examples 28 or 29, further comprising generating a triggering signal to measure interference levels associated with the infrastructure nodes of the LTE network infrastructure.

Example 31 may include the method of Examples 28 or 29, wherein the output power level associated with the at least one infrastructure node is different from an output power level assigned to a neighboring infrastructure node.

Example 32 may include the method of Examples 28 or 29, wherein a distance between the protection band for the at least one infrastructure node and a second protection band associated with a neighboring infrastructure node meets a determined threshold distance.

Example 33 may include a spectrum access system (SAS) comprising: a memory device and a processor, wherein the processor is configured to perform the method of any of Examples 27-32.

Example 34 may include an apparatus for an evolved Node B (eNB) comprising: a memory device to store configuration data, and one or more processing devices, operatively to the memory, to: generate a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and provide configuration data in accordance with the protection band, the configuration data indicates an output power level and a frequency band for the at least one infrastructure node to access data of the LTE network infrastructure.

Example 35 may include the apparatus for the eNB of Example 34, wherein the apparatus is further included in a Spectrum Access System (SAS) node.

Example 36 may include the apparatus for the eNB of Example 34, further comprising radio frequency circuitry to receive and transmit the configuration data associated with the protection band.

Example 37 may include the apparatus for the eNB of Examples 35 or 36, wherein the processing devices are further to generate a triggering signal to measure interference levels associated with the infrastructure nodes of the LTE network infrastructure.

Example 38 may include the apparatus for the eNB of Examples 35 or 36, wherein the processing devices are further to generate a first time slot based on the protection band, the first time slot indicates a time for the at least one of the infrastructure node to use the frequency band to access data in the LTE network infrastructure.

Example 39 may include the apparatus for the eNB of Example 38, wherein the time slot for the at least one of the infrastructure node is different from a second time slot assigned to a neighboring infrastructure node to use the frequency band.

Example 40 may include the apparatus for the eNB of Examples 35 or 36, wherein the output power level associated with the at least one infrastructure node is different from an output power level assigned to a neighboring infrastructure node.

Example 41 may include the apparatus for the eNB of Examples 35 or 36, wherein a distance between the protection band for the at least one infrastructure node and a second protection band associated with a neighboring infrastructure node meets a determined threshold distance.

Example 42 may include a computer readable storage medium storing executable instructions, that when executed by one or more processing devices, cause the processing devices to: generate, by the one or more processing devices, a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and provide configuration data in accordance with the protection band, the configuration data indicates an output power level and a frequency band for the at least one infrastructure node to access data of the LTE network infrastructure.

Example 43 may include the computer readable storage medium of Example 42, wherein the processing devices are associated with an evolved Node B (eNB) included in a Spectrum Access System (SAS) node.

Example 44 may include the computer readable storage medium of Example 42, wherein the processing devices are further to receive and transmit the configuration data associated with the protection band.

Example 45 may include the computer readable storage medium of Examples 43 or 44, wherein the processing devices are further to generate a triggering signal to measure interference levels associated with the infrastructure nodes of the LTE network infrastructure.

Example 46 may include the computer readable storage medium of Examples 43 or 44, wherein the processing devices are further to generate a first time slot based on the protection band, the first time slot indicates a time for the at least one of the infrastructure node to use the frequency band to access data in the LTE network infrastructure.

Example 47 may include the computer readable storage medium of Example 46, wherein the time slot for the at least one of the infrastructure node is different from a second time slot assigned to a neighboring infrastructure node to use the frequency band.

Example 48 may include the computer readable storage medium of Examples 43 or 44, wherein the output power level associated with the at least one infrastructure node is different from an output power level assigned to a neighboring infrastructure node.

Example 49 may include the computer readable storage medium of Examples 43 or 44, wherein a distance between the protection band for the at least one infrastructure node and a second protection band associated with a neighboring infrastructure node meets a determined threshold distance.

Example 50 may include an apparatus comprising: a memory to store network configuration data, and one or more processing devices coupled to the memory, the processing devices to: generate a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and provide configuration data in accordance with the protection band, the configuration data indicates an output power level and a frequency band for the at least one infrastructure node to access data of the LTE network infrastructure.

Example 51 may include the apparatus of Example 50, wherein the apparatus is further included in a Spectrum Access System (SAS) node.

Example 52 may include the apparatus of Example 50, further comprising radio frequency circuitry to receive and transmit the configuration data associated with the protection band.

Example 53 may include the apparatus of Examples 51 or 52, wherein the processing devices are further to generate a triggering signal to measure interference levels associated with the infrastructure nodes of the LTE network infrastructure.

Example 54 may include the apparatus of Examples 51 or 52, wherein the processing devices are further to generate a first time slot based on the protection band, the first time slot indicates a time for the at least one of the infrastructure node to use the frequency band to access data in the LTE network infrastructure.

Example 55 may include the apparatus of Example 54, wherein the time slot for the at least one of the infrastructure node is different from a second time slot assigned to a neighboring infrastructure node to use the frequency band.

Example 56 may include the apparatus of Examples 51 or 52, wherein the output power level associated with the at least one infrastructure node is different from an output power level assigned to a neighboring infrastructure node.

Example 57 may include the apparatus of Examples 51 or 52, wherein a distance between the protection band for the at least one infrastructure node and a second protection band associated with a neighboring infrastructure node meets a determined threshold distance.

Example 58 may include an apparatus comprising: one or more processing devices; means for generating a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and means for providing configuration data in accordance with the protection band, the configuration data indicates an output power level and a frequency band for the at least one infrastructure node to access data of the LTE network infrastructure.

Example 59 may include the apparatus of Example 58, further comprising the subject matter of any of Examples 50-57.

Example 60 may include a method comprising: generating, by one or more processing devices, a protection band based on interference measurements, the protection band is allocated to at least one of the infrastructure node of a Long-Term Evolution (LTE) network infrastructure, wherein the interference measurements are related to transmissions of data between infrastructure nodes of the LTE network infrastructure; and providing, by the one or more processing devices, configuration data in accordance with the protection band, the configuration data indicates an output power level and a frequency band for the at least one infrastructure node to access data of the LTE network infrastructure.

Example 61 may include the method of Example 60, further comprising generating a triggering signal to measure interference levels associated with the infrastructure nodes of the LTE network infrastructure.

Example 62 may include the method of Example 60, further comprising generating a first time slot based on the protection band, the first time slot indicates a time for the at least one of the infrastructure node to use the frequency band to access data in the LTE network infrastructure.

Example 63 may include the method of Example 62, wherein the time slot for the at least one of the infrastructure node is different from a second time slot assigned to a neighboring infrastructure node to use the frequency band.

Example 64 may include the method of Example 60, wherein the output power level associated with the at least one infrastructure node is different from an output power level assigned to a neighboring infrastructure node.

Example 65 may include the method of Example 60, wherein a distance between the protection band for the at least one infrastructure node and a second protection band associated with a neighboring infrastructure node meets a determined threshold distance.

Example 66 may include a spectrum access system (SAS) comprising: a memory device and a processor, wherein the processor is configured to perform the method of any of Examples 60-65.

Example 67 may include an apparatus for an evolved Node B (eNB) comprising: a memory device to store configuration data, and one or more processing devices, operatively to the memory, to: identify an interfering event based on measurements, the interfering event indicating a level of interference on a transmission link associated with a first infrastructure node and a second infrastructure node of a Long-Term Evolution (LTE) network infrastructure, wherein the measurements are related to transmission links associated with infrastructure nodes of the LTE network infrastructure; and determine a buffer zone based on the interfering event, the buffer zone indicating a separation in power level settings for equipment of the first infrastructure node and equipment of the second infrastructure node that use the transmission link.

Example 68 may include the apparatus for the eNB of Example 67, wherein in the apparatus is further included a Spectrum Access System (SAS) node.

Example 69 may include the apparatus for the eNB of Example 67, further comprising radio frequency circuitry to receive and transmit configuration data associated with the buffer zone to the first infrastructure node and the second infrastructure node.

Example 70 may include the apparatus for the eNB of Example 67, wherein a first power level setting assigned to the first infrastructure node is different from a second power level assigned to the second infrastructure node.

Example 71 may include the apparatus for the eNB of Examples 68, 69 or 70, wherein the processing devices are further to generate a triggering signal to measure interference levels associated with the infrastructure nodes of the LTE network infrastructure.

Example 72 may include the apparatus for the eNB of Examples 68, 69 or 70, wherein the processing devices are further to adjust a size of the buffer zone based on the measured interference levels.

Example 73 may include the eNB of Examples 68, 69 or 70, wherein responsive to the measure interference levels meeting a threshold level, the processing devices are further to increase the size of the buffer zone.

Example 74 may include the apparatus for the eNB of Examples 68, 69 or 70, wherein responsive to the measure interference levels falling below the threshold level, the processing devices are further to decrease the size of the buffer zone.

Example 75 may include a computer readable storage medium storing executable instructions, that when executed by one or more processing devices, cause the processing devices to: identify, by one or more processing devices, an interfering event based on measurements, the interfering event indicating a level of interference on a transmission link associated with a first infrastructure node and a second infrastructure node of a Long-Term Evolution (LTE) network infrastructure, wherein the measurements are related to transmission links associated with infrastructure nodes of the LTE network infrastructure; and determine a buffer zone based on the interfering event, the buffer zone indicating a separation in power level settings for equipment of the first infrastructure node and equipment of the second infrastructure node that use the transmission link.

Example 76 may include the computer readable storage medium of Example 75, wherein a first power level setting assigned to the first infrastructure node is different from a second power level assigned to the second infrastructure node.

Example 77 may include the computer readable storage medium of Examples 75 or 76, wherein the processing devices are further to generate a triggering signal to measure interference levels associated with the infrastructure nodes of the LTE network infrastructure.

Example 78 may include the computer readable storage medium of Examples 75 or 76, wherein the processing devices are further to adjust a size of the buffer zone based on the measured interference levels.

Example 79 may include the computer readable storage medium of Examples 75 or 76, wherein responsive to the measure interference levels meeting a threshold level, the processing devices are further to increase the size of the buffer zone.

Example 80 may include the computer readable storage medium of Examples 75 or 76, wherein responsive to the measure interference levels falling below the threshold level, the processing devices are further to decrease the size of the buffer zone.

Example 81 may include an apparatus comprising: a memory to store a data sequence, and one or more processing devices coupled to the memory, the processing devices to: identify an interfering event based on measurements, the interfering event indicating a level of interference on a transmission link associated with a first infrastructure node and a second infrastructure node of a Long-Term Evolution (LTE) network infrastructure, wherein the measurements are related to transmission links associated with infrastructure nodes of the LTE network infrastructure; and determine a buffer zone based on the interfering event, the buffer zone indicating a separation in power level settings for equipment of the first infrastructure node and equipment of the second infrastructure node that use the transmission link.

Example 82 may include the apparatus of Example 81, wherein the apparatus is further included in a Spectrum Access System (SAS) node.

Example 83 may include the apparatus of Example 81, further comprising radio frequency circuitry to receive and transmit configuration data associated with the buffer zone to the first infrastructure node and the second infrastructure node.

Example 84 may include the apparatus of Example 81, wherein a first power level setting assigned to the first infrastructure node is different from a second power level assigned to the second infrastructure node.

Example 85 may include the apparatus of Examples 82, 83 or 84, wherein the processing devices are further to generate a triggering signal to measure interference levels associated with the infrastructure nodes of the LTE network infrastructure.

Example 86 may include the apparatus of Examples 82, 83 or 84, wherein the processing devices are further to adjust a size of the buffer zone based on the measured interference levels.

Example 87 may include the apparatus of Examples 82, 83 or 84, wherein responsive to the measure interference levels meeting a threshold level, the processing devices are further to increase the size of the buffer zone.

Example 88 may include the apparatus of Examples 82, 83 or 84, wherein responsive to the measure interference levels falling below the threshold level, the processing devices are further to decrease the size of the buffer zone.

Example 89 may include an apparatus comprising: one or more processing devices; means for identifying an interfering event based on measurements, the interfering event indicating a level of interference on a transmission link associated with a first infrastructure node and a second infrastructure node of a Long-Term Evolution (LTE) network infrastructure, wherein the measurements are related to transmission links associated with infrastructure nodes of the LTE network infrastructure; and means for determining a buffer zone based on the interfering event, the buffer zone indicating a separation in power level settings for equipment of the first infrastructure node and equipment of the second infrastructure node that use the transmission link.

Example 90 may include the apparatus of Example 89, further comprising the subject matter of any of Examples 81-88.

Example 91 may include a method comprising: identifying, by one or more processing devices, an interfering event based on measurements, the interfering event indicating a level of interference on a transmission link associated with a first infrastructure node and a second infrastructure node of a Long-Term Evolution (LTE) network infrastructure, wherein the measurements are related to transmission links associated with infrastructure nodes of the LTE network infrastructure; and determining, by the one or more processing devices, a buffer zone based on the interfering event, the buffer zone indicating a separation in power level settings for equipment of the first infrastructure node and equipment of the second infrastructure node that use the transmission link.

Example 92 may include the method of Example 91, wherein a first power level setting assigned to the first infrastructure node is different from a second power level assigned to the second infrastructure node.

Example 93 may include the method of Example 91, further comprising generating a triggering signal to measure interference levels associated with the infrastructure nodes of the LTE network infrastructure.

Example 94 may include the method of Example 91, further comprising adjusting a size of the buffer zone based on the measured interference levels.

Example 95 may include the method of Example 91, further comprising responsive to the measure interference levels meeting a threshold level, increasing the size of the buffer zone.

Example 96 may include a spectrum access system (SAS) comprising: a memory device and a processor, wherein the processor is configured to perform the method of any of Examples 91-95.

While the disclosure has been described respect to a limited number of embodiments, those skilled in the art will appreciate numerous modifications and variations there from. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, that these specific details need not be employed to practice aspects of the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring aspects of the disclosure.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable medium. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" on "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "determining," "issuing," "providing," "measuring," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus,—comprising:
    a memory to store network configuration data; and
    one or more processing devices coupled to the memory, the one or more processing devices configured to:
        generate a protection band based on interference measurements, wherein the protection band is allocated to one or more infrastructure nodes of a Long-Term Evolution (LTE) network infrastructure, wherein the one or more infrastructure nodes operate in licensed and unlicensed spectrum within a corresponding census tract, and wherein the interference measurements are related to transmissions of data between the one or more infrastructure nodes of the LTE network infrastructure;
        generate a triggering signal to measure interference levels associated with the one or more infrastructure nodes of the LTE network infrastructure; and
        determine a time slot for-at least one infrastructure node of the one or more infrastructure nodes based on the protection band, wherein the time slot indicates an allocated time frame to access data in the LTE network infrastructure using a radio frequency in accordance with the protection band.

2. The apparatus of claim 1,
    wherein the apparatus is further included in a Spectrum Access System (SAS) node, and wherein the SAS node is configured to coordinate spectrum use between incumbent federal users, Priority Access License Users, and General Authorized Access Users.

3. The apparatus of claim 1,
    further comprising radio frequency circuitry configured to transmit configuration settings related to the time slot to the at least one infrastructure node.

4. The apparatus-claim 1,
    wherein the time slot for the at least one infrastructure node is different from a second time slot allocated to a neighboring infrastructure node of the one or more infrastructure nodes using the radio frequency.

5. The apparatus of claim 1,
wherein an output power level associated with the at least one infrastructure node is different from an output power level assigned to a neighboring infrastructure node of the one or more infrastructure nodes.

6. The apparatus of claim 1,
wherein a distance between the protection band for the at least one infrastructure node and a second protection band associated with a neighboring infrastructure node meets a determined threshold distance.

7. The apparatus of claim 1,
wherein the triggering signal includes an indication of a number of available transmission links.

8. The apparatus of claim 1,
wherein the triggering signal includes an indication of a transmission link with a minimum threshold level of interference.

9. A non-transitory computer readable storage medium storing executable instructions, that when executed by one or more processing devices, cause the one or more processing devices to:
identify an interfering event based on measurements, wherein the interfering event indicates a level of interference on a transmission link associated with a first infrastructure node and a second infrastructure node of a Long-Term Evolution (LTE) network infrastructure, wherein the first and second infrastructure nodes operate in licensed and unlicensed spectrum within a corresponding census tract, and wherein the measurements are related to transmission links associated with infrastructure nodes of the LTE network infrastructure;
generate a triggering signal to measure interference levels associated with the infrastructure nodes of the LTE network infrastructure; and
determine a buffer zone based on the interfering event, the buffer zone indicating a separation in power level settings for equipment of the first infrastructure node and equipment of the second infrastructure node that use the transmission link.

10. The non-transitory computer readable storage medium of claim 9,
wherein a first power level setting assigned to the first infrastructure node is different from a second power level assigned to the second infrastructure node.

11. The non-transitory computer readable storage medium of claim 9,
wherein the executable instructions, when executed by the one or more processing devices, cause the one or more processing devices to adjust a size of the buffer zone based on measured interference levels.

12. The non-transitory computer readable storage medium of claim 11,
wherein, responsive to the measured interference levels meeting a threshold level, the executable instructions, when executed by the one or more processing devices, cause the one or more processing devices to increase the size of the buffer zone.

13. The non-transitory computer readable storage medium of claim 11,
wherein, responsive to the measured interference levels falling below a threshold level, the executable instructions, when executed by the one or more processing devices, cause the one or more processing devices to decrease the size of the buffer zone.

14. The non-transitory computer readable storage medium of claim 9,
wherein the triggering signal further includes an indication of a number of available transmission links.

15. An apparatus comprising:
a memory to store network configuration data, and
one or more processing devices coupled to the memory, the one or more processing devices configured to:
generate a triggering signal to measure interference levels associated with infrastructure nodes of a Long-Term Evolution (LTE) network infrastructure, wherein the infrastructure nodes operate in licensed and unlicensed spectrum within a corresponding census tract, and wherein the triggering signal includes an indication of a number of available transmission links;
generate a protection band based on interference measurements, wherein the protection band is allocated to at least one infrastructure node of the LTE network infrastructure, wherein the interference measurements are related to transmissions of data between infrastructure nodes of the LTE network infrastructure; and
provide configuration data in accordance with the protection band, wherein the configuration data indicates an output power level and a frequency band for the at least one infrastructure node to access data of the LTE network infrastructure.

16. The apparatus of claim 15,
wherein the apparatus is included in a Spectrum Access System (SAS) node, and wherein the SAS node is configured to coordinate spectrum use between incumbent federal users, Priority Access License Users, and General Authorized Access Users.

17. The apparatus of claim 15,
further comprising radio frequency circuitry configured to receive and transmit the configuration data associated with the protection band.

18. The apparatus of claim 15,
wherein the one or more processing devices are further configured to generate a first time slot based on the protection band, wherein the first time slot indicates a time for the at least one infrastructure node to use the frequency band to access data in the LTE network infrastructure.

19. The apparatus of claim 18,
wherein the first time slot for the at least one infrastructure node is different from a second time slot assigned to a neighboring infrastructure node to use the frequency band.

20. The apparatus of claim 15,
wherein a number of bits included in the triggering signal is related to the number of available transmission links.

* * * * *